United States Patent [19]
VanGinhoven et al.

[11] 4,409,784
[45] Oct. 18, 1983

[54] METHOD OF WRAPPING ROLL BALES WITH PLASTIC FILM

[75] Inventors: Robert M. VanGinhoven, Lancaster; Shaun A. Seymour, New Holland; Harry C. Eberly, Narvon, all of Pa.

[73] Assignee: Sperry Corporation, New Holland, Pa.

[21] Appl. No.: 341,378

[22] Filed: Jan. 21, 1982

Related U.S. Application Data

[63] Continuation-in-part of Ser. No. 257,054, Apr. 24, 1981, Pat. No. 4,366,665.

[51] Int. Cl.³ .............................................. A01D 91/00
[52] U.S. Cl. ................................. 56/341; 56/DIG. 2; 100/5
[58] Field of Search ................... 56/341, 343, DIG. 2; 100/88, 5, 87

[56] References Cited

U.S. PATENT DOCUMENTS

| | | | |
|---|---|---|---|
| 4,167,844 | 9/1979 | Freimuth | 56/343 |
| 4,173,112 | 11/1979 | Meiners | 56/341 |
| 4,205,513 | 6/1980 | Shokoples | 56/343 |
| 4,262,478 | 4/1981 | Pentith | 56/341 |

FOREIGN PATENT DOCUMENTS

| | | | |
|---|---|---|---|
| 12684 | 6/1980 | European Pat. Off. | 56/341 |
| 2705101 | 8/1978 | Fed. Rep. of Germany | 56/341 |

*Primary Examiner*—Jay N. Eskovitz
*Attorney, Agent, or Firm*—Darrell F. Marquette; Larry W. Miller; Frank A. Seemar

[57] ABSTRACT

A method used to wrap roll bales of crop material with plastic film. The method involves holding the end of a supply roll of plastic film between stationary feed rolls as a bale is formed, and then delivering the end of the plastic film to the outer surface of a completed roll bale by driving the feed rolls. The method also involves wrapping the roll bale with a suitable number of layers of the plastic film by driving the feed rolls while rotating the roll bale, and then severing the plastic film at a location between the roll bale and the feed rolls by stopping the feed rolls and moving a cutoff bar into contact with the plastic film while continuing to rotate the roll bale.

1 Claim, 14 Drawing Figures

METHOD OF WRAPPING ROLL BALES WITH PLASTIC FILM

CROSS REFERENCE TO RELATED APPLICATION

This Application is a continuation-in-part of application Ser. No. 257,054, filed Apr. 24, 1981, now U.S. Pat. No. 4,366,665, and incorporated herein by reference.

BACKGROUND OF THE INVENTION

For many years, the preferred method of harvesting forage crop material has been to cut it, permit it to dry to at least a limited extent, form it into windrows, and then form the windrows into separate rectangular bales tied by wire or twine. In more recent years, formation of the windrows into roll-type bales has become popular. Such roll bales are usually secured by spirally winding binder twine around the rolls to a suitable extent. One advantage of roll bales is that they may be stored in a field and the cylindrical nature thereof forms a natural means to shed water when rained upon, but at least the outermost portions of such roll bales becomes deteriorated if left exposed over a period of time.

To obviate the aforementioned deterioration of round roll bales, very recent proposals have come forth to protect such bales with covering material, such as plastic film. One example of such solution is the subject of prior U.S. Pat. No. 4,173,112 to Meiners, dated Nov. 6, 1979, in which a roll bale is wrapped in sheet plastic film as the bale is formed and then the covering plastic film is severed from a supply roll by a shaped blade having a V-shaped cutting edge. The end of the wrapped film is then glued to the roll or otherwise the roll may be left in a field and permit the weight of the roll to prevent unwrapping of the covering film from the roll bale.

The wrapping art also offers some suggestions as to how a large cylindrical object, such as a roll of paper may be wrapped with a paper sheet, such as proposed in prior U.S. Pat. No. 4,224,782, to Moflag, dated Sept. 30, 1980, but adaptation of the rather complex structure thereof to a baler for round bales appears to be cumbersome and complex.

A German published application, No. 2,705,101, filed Nov. 23, 1978, appears to suggest wrapping a roll bale of agricultural material with a strip of what seems to be plastic material of limited width wound spirally around a roll bale with the edges of the successive convolutions overlapping a limited extent by threading the supply roll transversely across the bale somewhat similarly to the wrapping of binder twine around such a bale, as mentioned above relative to roll balers of earlier years.

SUMMARY OF THE INVENTION

The present invention provides a method of wrapping a roll bale of crop material with plastic film. As a roll bale is formed in a baler, the end of a supply roll of plastic film is held between feed rolls. When a complete roll bale has been formed, the end of the supply roll of plastic film is delivered to the outer surface of the roll bale by driving the feed rolls. In the preferred embodiment of the invention, the feed rolls are driven by operating an electric clutch which is connected thereto. The roll bale is wrapped with at least one full layer of the plastic film by driving the feed rolls while rotating the roll bale. After the roll bale has been wrapped, the plastic film is severed at a location between the roll bale and the feed rolls by stopping the feed rolls and moving a cutoff bar to a severing position into contact with the plastic film while continuing to rotate the roll bale. In the preferred embodiment, the feed rolls are stopped by operating the electric clutch connected thereto and the cutoff bar is simultaneously moved to the severing position by operating a solenoid which is connected to the cutoff bar.

DETAILED DESCRIPTION OF THE PREFERRED EMBODIMENT

Figure 1:
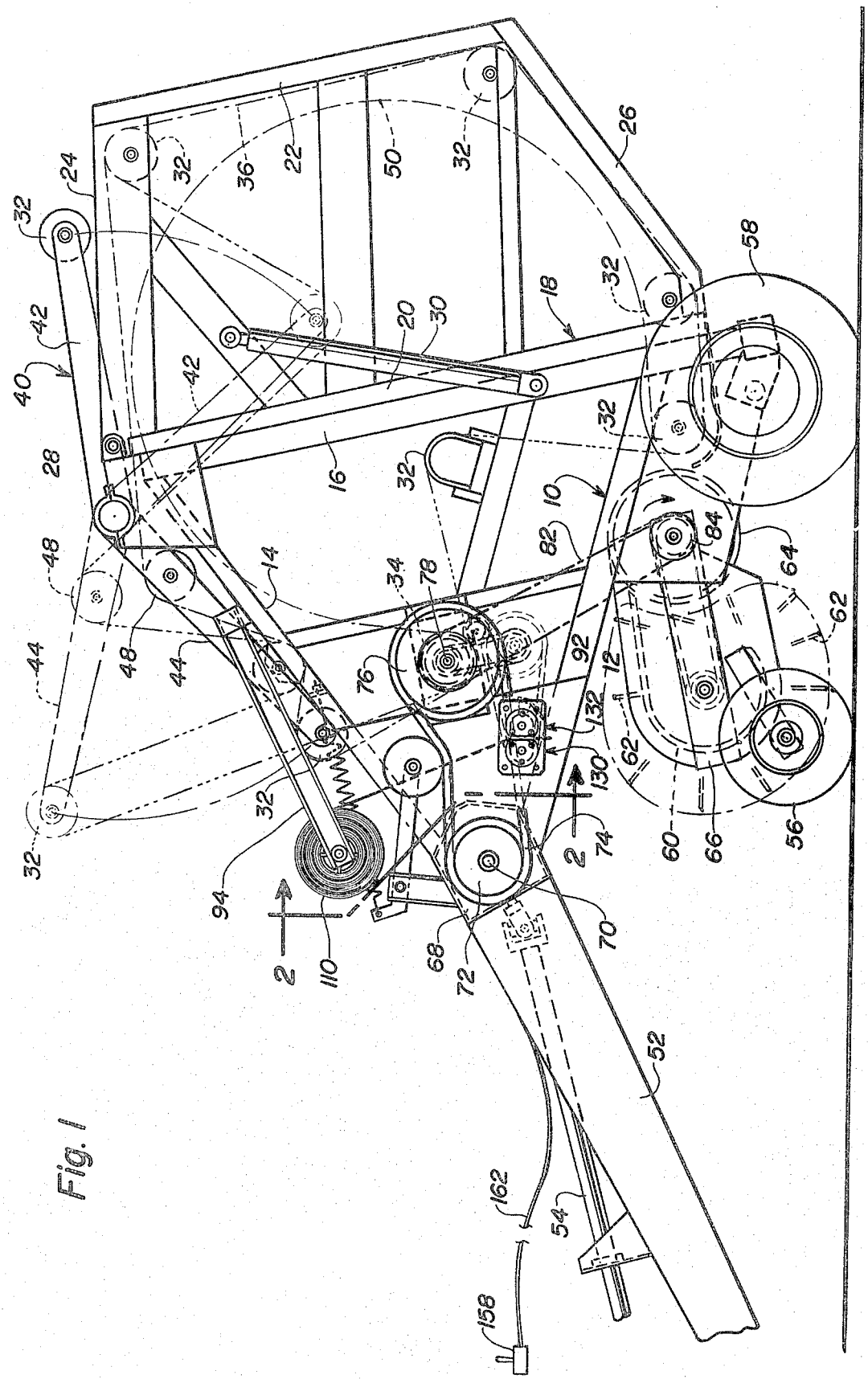
FIG. 1 is a side elevation of a baler for forming round roll bales and including means for wrapping the plastic film around the formed bale in accordance with the principles of the invention, said view, at the left-hand end, showing fragmentarily a drive shaft and tongue, attachable to a tractor.

FIG. 1 is a side elevation of a machine for forming roll bales. Essentially, the machine is of the type shown in a number of prior patents, of which U.S. Pat. No. 3,901,007, to Blanshine et al., Hay Roll Forming Machine, dated Aug. 26, 1975, is one typical example of a machine which normally is propelled by being connected to a tractor, not shown, which pulls the baler over a windrow that is continuously moved into the machine and formed into a round roll bale, comprising successive layers of the material, the roll being without a supplemental core of any kind, and upon the formation of a roll bale of suitable size, as controlled by the operator of the tractor, the machine is stopped but the apron which surrounds the bale and continuously rotates it, continues to revolve to effect the wrapping of the formed bale, with a limited number of convolutions of stretched cling-type plastic film, and then is ejected from the machine onto the field.

Referring to FIG. 1, the baler comprises a substantially triangular shaped frame 10 consisting of frame members 12, 14, and 16, which are rigidly connected and it will be understood that such a triangular-shaped frame member is provided respectively at opposite sides of the baler, and said side frame members being connected by transverse frame members, not shown, but of the type illustrated in said aforementioned patent. A supplemental, movable frame section 18, in side elevation, is somewhat in the form of a trapezoid, and consists of parallel frame members 20 and 22, to the ends of which an additional pair of angularly related frame members 24 and 26 are connected. The supplemental frame section 18 is pivotally connected to the upper portion of the triangular shaped frame 10 by a pivot 28, and the supplemental section is moved about said pivot at the time of discharging a formed bale by means of a pair of hydraulic cylinder units 30, respectively disposed at opposite sides of the baler. Supplemental frame section 18 supports a plurality of freely-rotatable guide sheaves 32 and triangular frame 10 supports additional freely-rotatable guide sheaves 32, as well as drive sheaves 34, which propel a flexible, endless apron 36 consisting of a pair of endless chains respectively disposed adjacent opposite sides of the baler in the frames 10 and 18, said chains supporting transversely therebetween a plurality of spaced, parallel bars 38, best shown in FIG. 2. This type of structure is disclosed in said aforementioned U.S. Pat. No. 3,901,007. In view of the fact that the bale, while being formed, continuously expands in diameter, it is essential that the apron 36 be arranged for suitable expansion from an initial position to an ultimate final position, and this is accomplished by a rocker arm arrangement 40, consisting of pairs of angularly related arms 42 and 44 supported upon a shaft 46, pivotally mounted at the upper end of triangular frame 10, as clearly shown in FIG. 1. The outer ends of the arms 42 and 44 also support freely-rotatable guide sheaves 32 thereon, the arms 44 additionally supporting further guide sheaves 48, the rocker arm arrangement 40 comprising pairs of the arms 42 and 44 respectively at opposite sides of the baler frame, and adapted to be moved initially from the phantom position, shown in FIG. 1, to the full-line position shown therein, as the apron 36 expands to form the substantially circular configuration 50, shown in FIG. 1, and illustrated by a broken line, and circular configuration representing the ultimate size of a roll bale to be formed by the baler, and the rocking of the arm arrangement 40 permitting the expansion of the apron around the completed roll bale by movement of the rocker arm arrangement 40.

The frame 10 has a tongue 52 extending forwardly therefrom and connected to an appropriate tractor, not shown, the tractor also having a PTO to which a drive shaft 54 is connected for driving the operating means on the baler. The baler frame is supported by pairs of wheels 56 and 58, respectively mounted on portions of the frame 10 at opposite sides of the baler. The lower forward portion of the baler also supports a driven crop pickup conveyor 60 having appropriate fingers 62 projecting therefrom, the conveyor extending toward a roller 64, the shafts of which are mounted in appropriate bearings in angular frame members 66, of which one is disposed adjacent each side of the baler. Preferably, the roller 64 consists of a hollow metal drum with a coating or layer of rubber on its outer surface.

Figure 2:
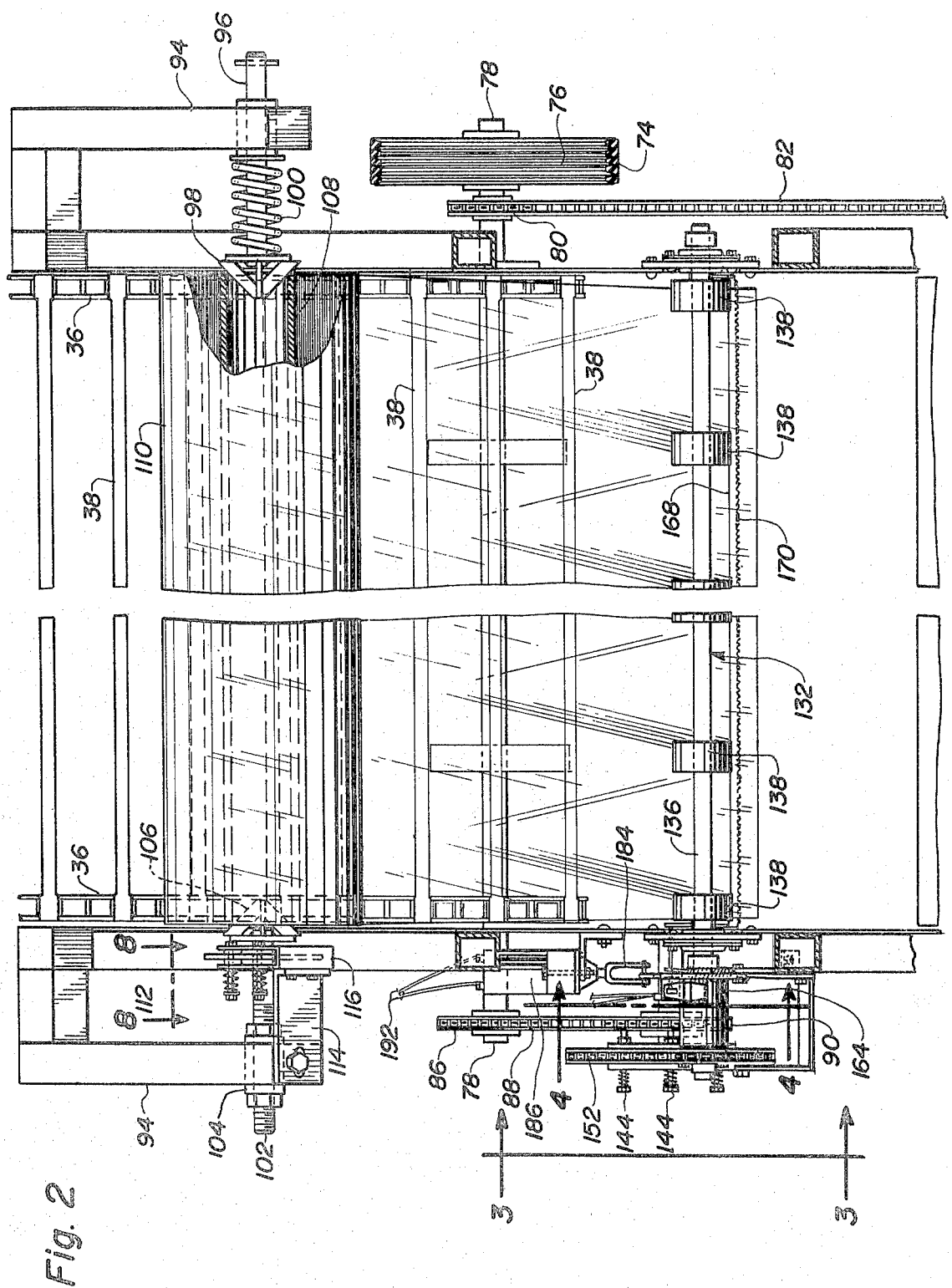
FIG. 2 is a fragmentary, further enlarged, vertical sectional elevation of certain portions of the baler shown in FIG. 1, as seen on the line 2—2 thereof.

The PTO operates drive shaft 54 which, in turn, operates a gear box 68, which includes a transverse drive shaft 70 upon which a multiple sheave 72 is mounted, and around which a plurality of V-belts 74 extend, as clearly shown in FIGS. 1 and 2, said V-belts 74 also extending around a larger diameter multiple sheave 76 supported on shaft 78, which is one of the principal drive shafts of the baler.

Also, as seen in FIG. 2, mounted upon shaft 78 is a smaller diameter drive sheave 80, around which a sprocket chain 82 extends, said chain also extending around a drive sheave 84, see FIG. 1, connected to the shaft of the roller 64 of the crop pickup conveyor 60, and thereby operates the same to drive said conveyor in the direction of the arrow, shown in FIG. 1, relative to the roller 64.

Referring to FIG. 2, the shaft 78, at the left-hand end, also supports another drive sheave 86, around which an endless sprocket chain 88 extends, the chain 88 also extending around the sprocket gear 90, fixed to a jack shaft 92.

The frame 10 supports a pair of forwardly extending supporting arms 94, see FIG. 1, the outer ends of which, as best shown in FIG. 2, respectively support an axially movable short shaft 96 having a conical roll-supporting member 98 on the inner end thereof which is spring-pressed to the left, as viewed in said figure, by means of a compression spring 100. The left-hand arm 94, as viewed in FIG. 2, supports a short shaft 102, which extends through a bushing 104 which is rotatably mounted in the outer end of arm 94, and the inner end of shaft 102 supports another conical roll-supporting member 106, best shown in FIG. 2. The conical roll-supporting members 98 and 106 respectively support therebetween the tubular core 108, see FIG. 2, of a roll 110 of plastic film of the stretch cling-type, the width of said material preferably being greater by a predetermined amount than the length of the roll of crop material to be covered thereby, particularly for purposes of permitting the extending ends of the wrapped film material, when in finished wrapped condition, shrinking or contracting a limited around, and providing somewhat cuff-like end arrangements to further secure the wrapped film around a finished bale and also prevent contracting of the same in axial directions while being stored.

Figure 8:
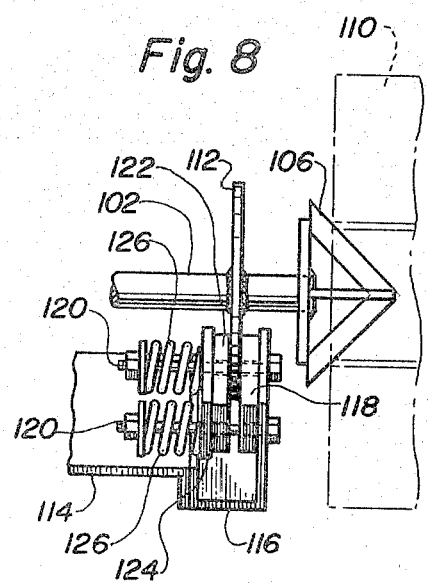
FIG. 8 is a fragmentary horizontal sectional view of friction drag mechanism for the plastic supply roll, as seen on the line 8—8 of FIG. 2.

For purposes of maintaining the plastic film material taut at all times during operation, especially to prevent overrunning of the roll of material while being withdrawn from the roll by mechanism described hereinafter, the shaft 102 is provided with friction brake means, best illustrated in FIG. 8. Said brake means somewhat resembles a disc brake on automotive vehicles in that a circular disc 112 is fixed to the shaft 102 adjacent member 106, and a transverse arm 114, which is connected at one end to supporting arm 94 at the left-hand end of FIG. 2, supports a bracket 116 to which one friction shoe 118 is fixed, and a pair of bolts extend through openings in said shoe to fix it against movement relative to the shoe 116, the bolts 120 also extending through a movable friction shoe 122, backed up by a plate 124, which is resiliently pressed by springs 126 against one face of the disc 112, while the fixed shoe 118 engages the other face thereof, and thus, provides adjustable tension means to maintain the film 110 under tension at all times, as described in further detail hereinafter.

Figure 4:
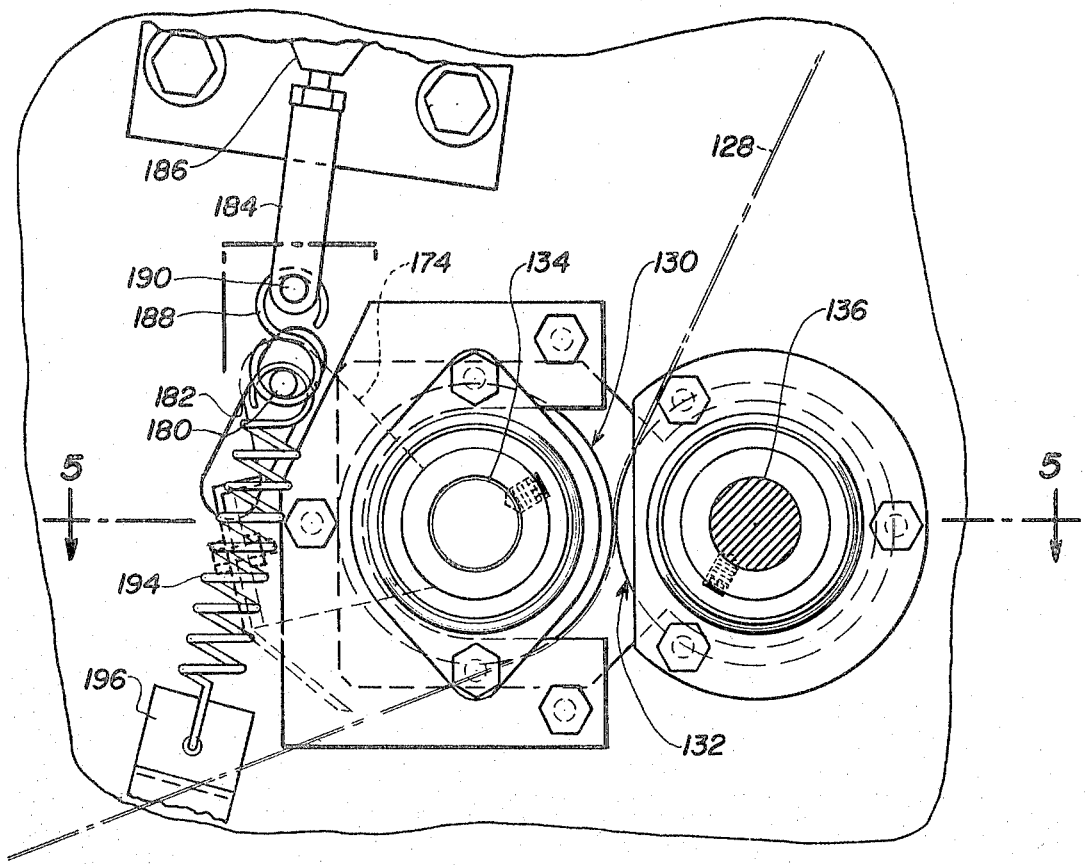
FIG. 4 is a further vertical sectional view illustrated fragmentarily, showing further details of certain drive means of the baler, as seen on the line 4—4 of FIG. 2.
Figure 5:
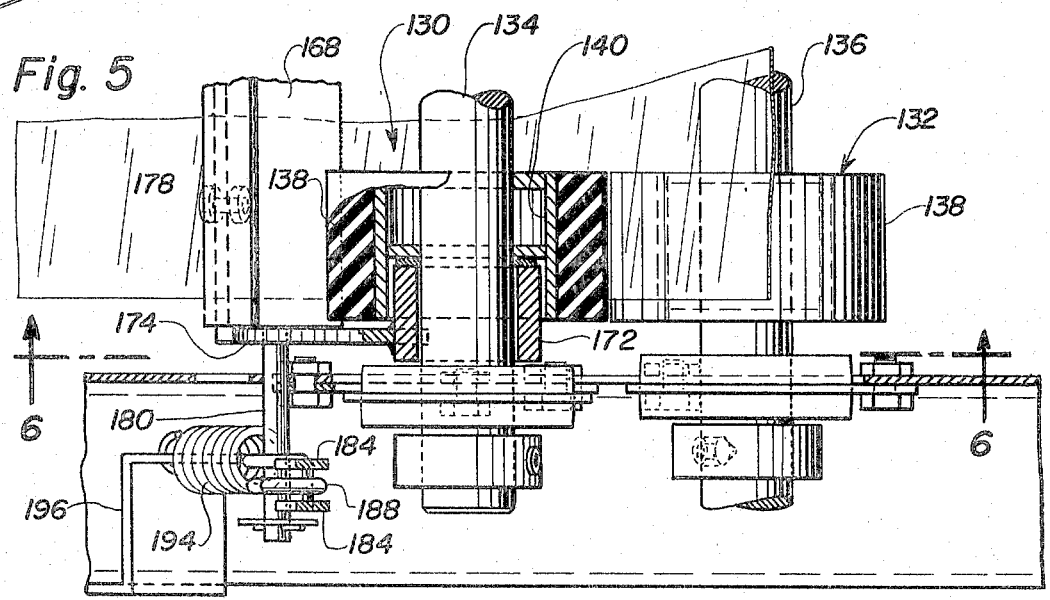
FIG. 5 is a horizontal fragmentary sectional view of the mechanism shown in FIG. 4, as seen on the line 5—5 thereof.
Figure 6:
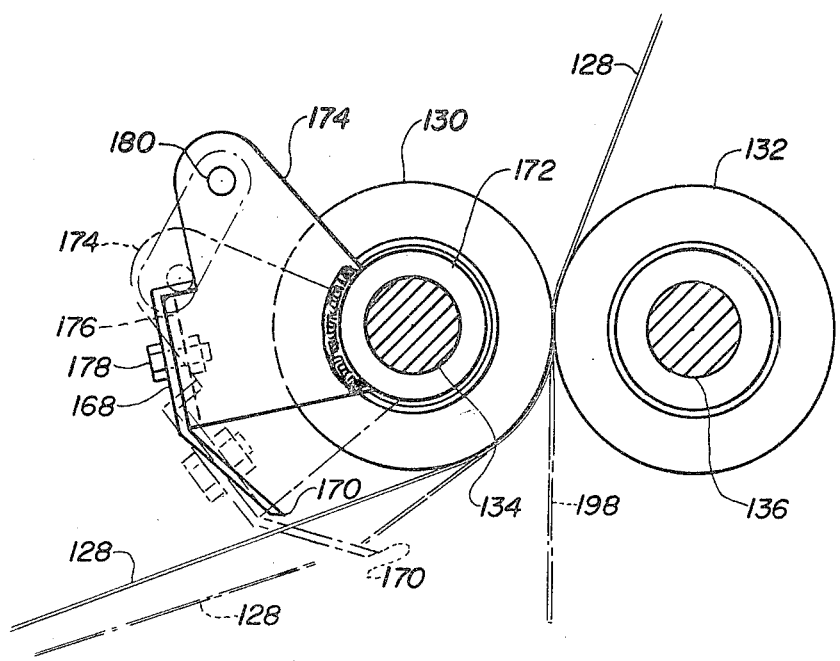
FIG. 6 is a vertical sectional view, somewhat diagrammatically illustrating the manner in which film severing mechanism is located and operated, as seen on the line 6—6 of FIG. 5, showing the position of the severing knife in idle position in full lines and, in phantom, illustrating the same in operative, film-severing position.
Figure 6A:
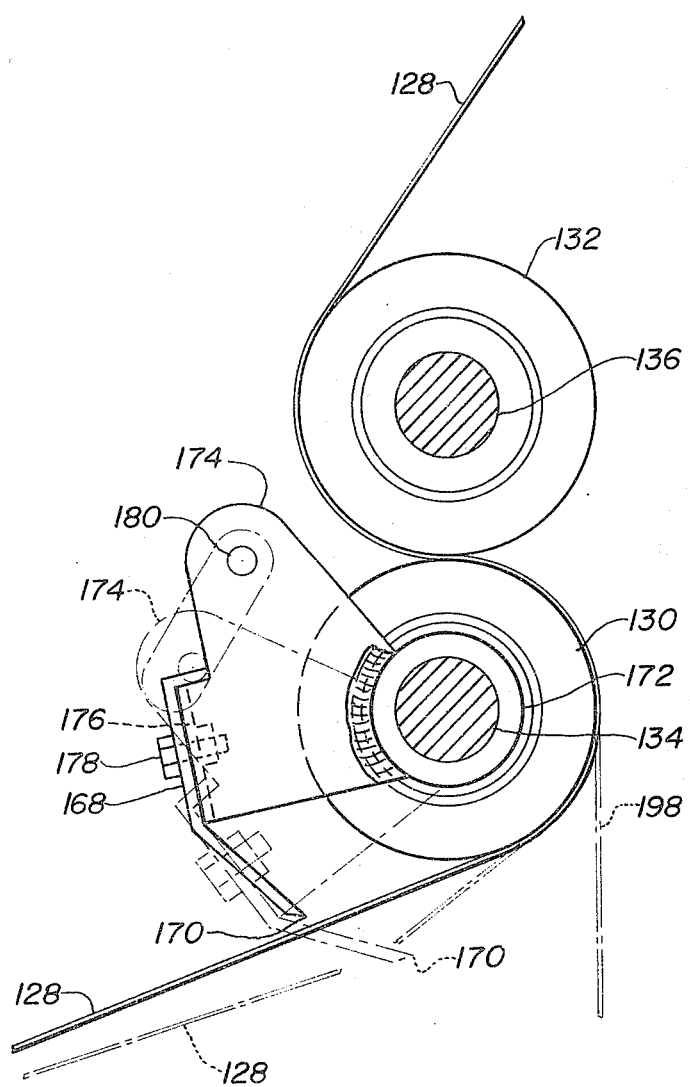
FIG. 6a is a view similar to FIG. 6 illustrating an alternative arrangement of the feed rolls.

As shown in FIG. 1, the leading end 128 of the film of supply roll 110 extends to and between a pair of composite-type feed nip rolls 130 and 132, which are best shown in detail in FIGS. 4 and 5. Said feed nip rolls actually comprise parallel shafts 134 and 136 upon which a plurality of relatively narrow friction rolls 138 are fixed. The rolls 138, as shown best in FIG. 5, in which one of the same is shown in section, consists of cylindrical, relatively thick rubber friction members mounted upon cylindrical metal cores 140, which, in turn, are fixed to the shafts 134 and 136. Referring to FIG. 2, in which composite feed roll 132 is shown, it will be seen that the shaft 136, as well as shaft 134, behind shaft 136 in FIG. 2, supports a plurality of the friction rolls 138 in spaced relationship to each other, the spaces being sufficient for preventing any substantial accumulation of chaff or other extraneous material between the feed rolls 130,132. The film material is constantly engaged by the friction rolls 138, in view of the fact that the rolls 138 on the respective shafts 134 and 136 are directly opposite each other. Alternatively, the feed rolls 130,132 may comprise solid continuous friction rolls fixed on the shafts 134, 136 instead of the plurality of narrow friction rolls 138. As shown in FIG. 6a, the feed rolls 130,132 may be arranged with the feed roll 132 positioned directly above the feed roll 130 rather than beside the feed roll 130.

Figure 3:
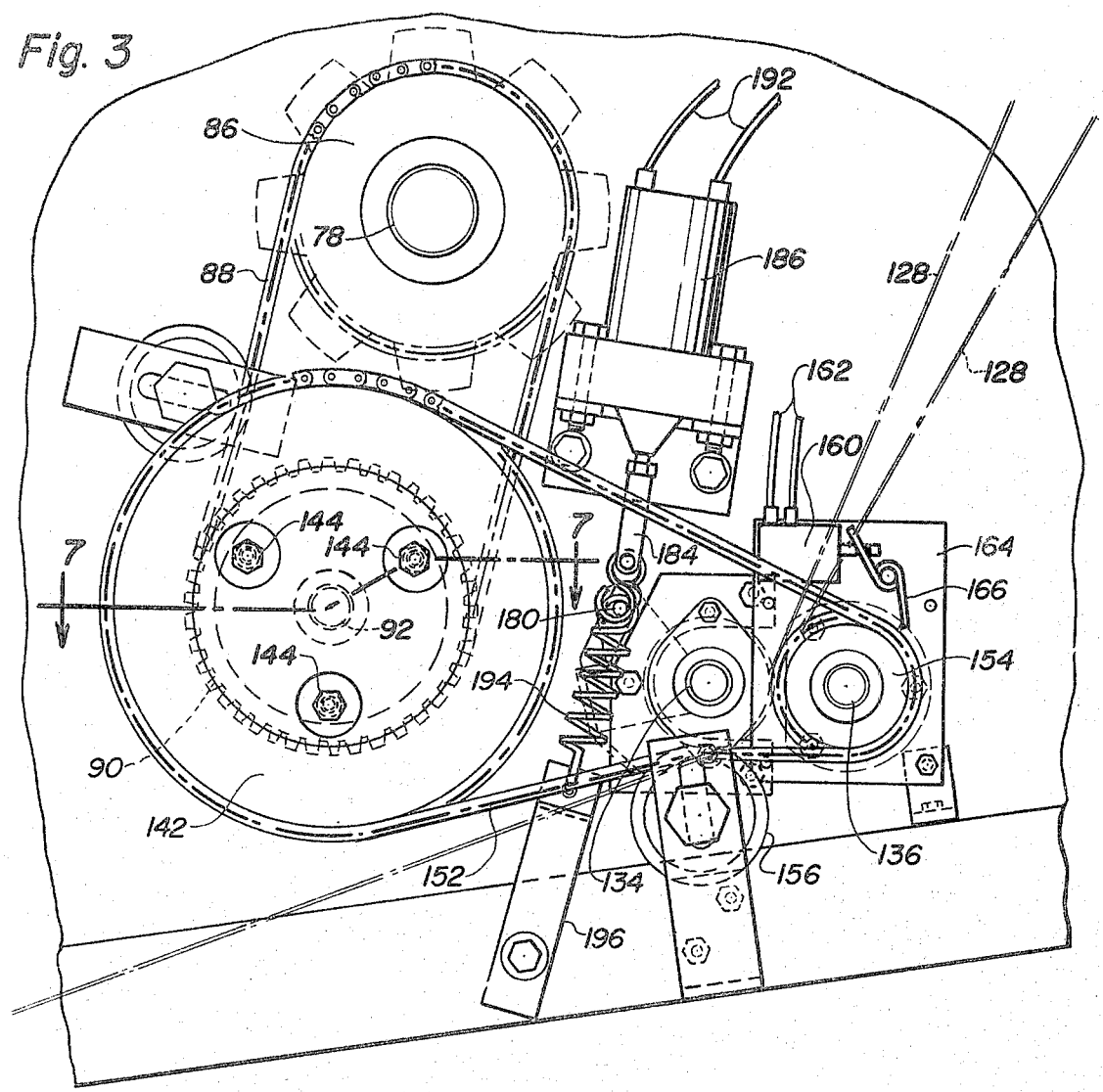
FIG. 3 is a fragmentary vertical sectional elevation, on a still further enlarged scale, showing details of some of the drive mechanism of the baler, as seen on the line 3—3 of FIG. 2.
Figure 7:
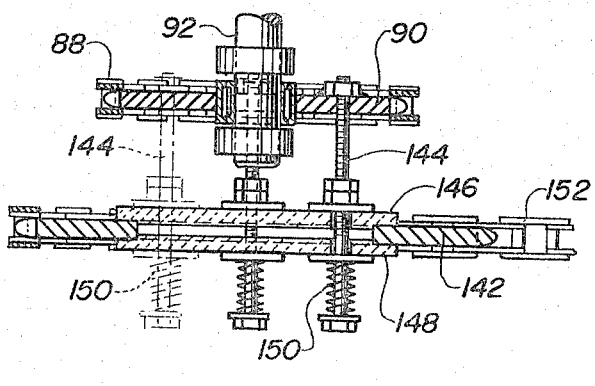
FIG. 7 is a fragmentary horizontal sectional view of details of slip clutch mechanism shown in FIG. 3, as seen on the line 7—7 of said figure.

Referring to FIG. 3, as has been explained above, jack shaft 92 drives sprocket gear 90. In turn, sprocket gear 90 drives a larger diameter sprocket gear 142, and acutally supports the same, as is best shown in FIG. 7, in sectional view, by means of a plurality of bolts 144, which are fixed at one end to sprocket gear 90, and also extend through a pair of friction discs 146 and 148. Also, the sprocket 142 actually is a flat annular configuration of which the center is removed and the peripheral edges of the central portion of sprocket gear 142 respectively are engaged by rims of the friction discs 146 and 148 in a yieldable manner caused by the compression springs 150. The arrangement just described actually comprises a friction clutch for the sprocket gear 142 around which chain 152 extends, the chain also extending around driven sprocket gear 154 which is rotatably supported upon shaft 136 in a manner to be engaged with said shaft to drive the same when driving of the friction feed rolls 130 and 132 is to commence. An adjustable tightening idler sprocket 156 at each side of the baler respectively engage the sprocket chains 152.

It is to be understood that at the commencement of the formation of a round roll bale, the film roll 110 is stationary, as are the friction feed rolls 130 and 132, and the leading end of the film extends from the supply roll 110 to the friction rolls and usually a short leading end extends beyond the feed rolls and hangs there. When the roll bale has reached the desired diameter, the operator of the tractor actuates a control switch 158, as shown somewhat diagrammatically in FIG. 1, for purposes of energizing an electric clutch operator 160, shown in FIG. 3, from which a pair of electric conducting wires 162 extend therefrom to the switch 158, which is also in circuit with a source of power, not shown. The clutch operator 160 is part of an electric clutch 164 of a commercial type which has the capability of interengaging the shaft 136 and the driven sprocket gear 154 thereon by mechanism which includes a dog 166 actuated by the clutch operator 160. This occurs when the feed of the leading end of film 128 is to commence. In FIG. 3, two paths of the film 128 are shown in phantom, one of these being when the supply roll is substantially full, and the other when the supply roll is nearly exhausted. In any event, operation of the electric clutch 164 causes the friction feed rolls 130 and 132 to advance said leading end of the film into the path of the crop pickup conveyor fingers 62 which carry it inwardly toward the roller 64. The leading end is readily engaged by the rotating roller 64 when the tractor and baler have been stopped from forward movement but while the apron 36 continues to rotate the bale a desired number of revolutions to permit a suitable number of plies of the plastic film to be wrapped around the bale.

Severence of the plastic film from the wrapped bale is effected by the following arrangement. As indicated above, the film extending from the supply roll 110 to the friction feed rolls 130 and 132 is maintained under tension. Referring to FIGS. 4-6, especially to FIG. 6, it will be seen that the severing means for the film comprises a cutoff bar 168, which extends entirely across the baler between opposite sides thereof and is of an irregular angular shape, as shown best in end view in FIG. 6, for purposes of strengthening the cutoff bar to prevent bending or wavering of the same. The terminal edge 170 of bar 168 is toothed continuously between opposite ends, as shown in FIG. 2. Referring to FIG. 5, where one end of shaft 134 is shown, it will be seen that said end of the shaft is surrounded by a short sleeve 172 and a similar sleeve extends around the opposite end of shaft 134. Extending radially from each of the sleeves 172 is a radial plate or arm 174 of a somewhat V-shaped configuration, one end of each arm being welded to the sleeve 172 and the outer end having a lateral flange 176 to receive a connecting bolt 178, which also extends through each end of the toothed cutoff bar 168.

Projecting outwardly from one arm 174 is a pin 180 which extends through a slot 182, see FIG. 4, in the side frame plate. A link 184 which extends from the core of solenoid 186, best shown in FIG. 3, is connected by a hook member 188 to pin 180. Also, link 184 actually is a clevis comprising a pair of parallel members, shown in section in FIG. 5, and having a pin 190 extending therebetween, which is engaged by the hook member 188.

Solenoid 186 also is connected by a pair of electrical conductors 192 to the circuit in which switch 158 is included. Further, the circuit and a type of control switch 158, is such that during the time the roll bale is being formed, the solenoid 186 is energized and holds the cutoff bar 168 with its toothed edge in retracted, full-line position, shown in FIG. 6, so that it does not engage the film 128, which is being fed by the friction feed rolls 130 and 132 in the direction to encircle the roll bale. Upon completion of the wrapping of the film around a roll bale, however, the operator on the tractor then again actuates switch 158 in a manner to de-energize the electric clutch 164, which immediately halts the driving of the friction feed rolls 130 and 132 and simultaneously de-energizes the solenoid 186 in a manner to permit the toothed cutoff bar 168 to move to the phantom position, shown in FIG. 6, and thereby engage the film section 128 to penetrate it, as shown in the second, lower position thereof, illustrated in FIG. 6, while the wrapped roll bale continues to be rotated by the apron 36, whereby such continued pull of the film by the rotating bale insures severance of the same by the toothed terminal edge 170 of the cutoff bar 168. Movement of the cutoff bar to the severing position, shown in phantom in FIG. 6, is instantly effected by tension spring 194, which extends between a fixed bracket 196 on the baler frame and pin 180. One skilled in the art will further realize that a switch 158 spring-loaded to the off position, or a switch 158 in conjunction with a timer (not shown) would be equally operable instead of the switch 158 as described above.

Following the severance of the film as described, there will be a short section of the film 198 depending from the stationary friction feed rolls 130 and 132 and thus, be in position to be fed thereby to the next roll bale to be formed and wrapped.

Figure 9A:
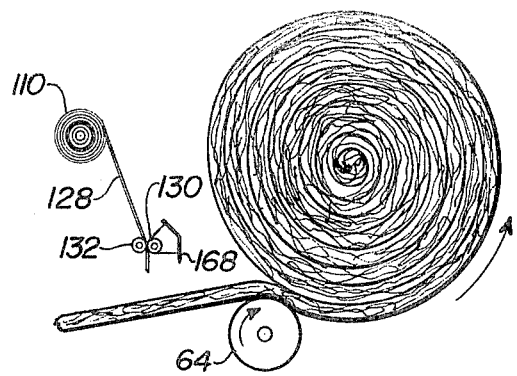
FIGS. 9a through 9e are diagrammatic views illustrating the various steps of the wrapping method of the present invention.
Figure 9B:
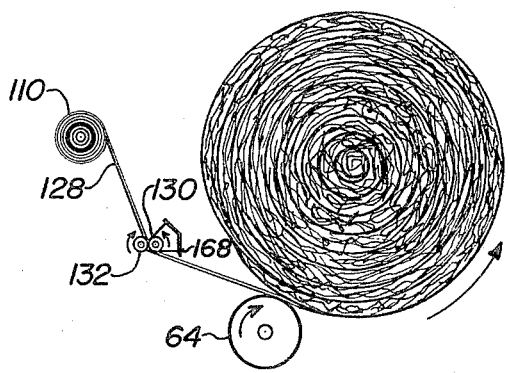
Figure 9C:
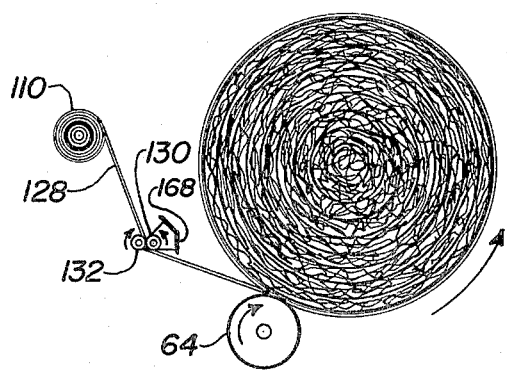
Figure 9D:
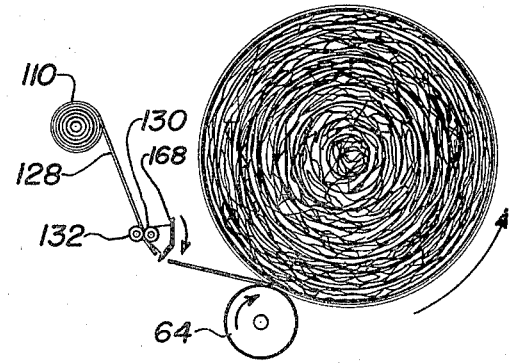
Figure 9E:
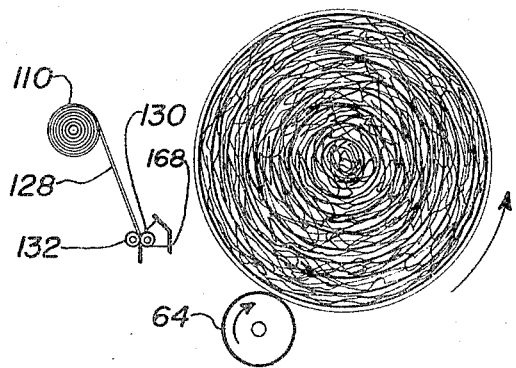

Referring to FIGS. 9a through 9e, the wrapping method of the present invention is illustrated diagrammatically. As a roll bale is formed in the baler, the leading end 128 of the plastic film roll 110 is held between the stationary feed rolls 130,132 as shown in FIG. 9a. When a complete roll bale has been formed, the leading end 128 of the plastic film is delivered to the outer surface of the roll bale as shown in FIG. 9b by operating the electric clutch 164 to drive the feed rolls 130,132. The roll bale is wrapped with a suitable number of layers of the plastic film as shown in FIG. 9c by driving the feed rolls 130,132 while rotating the roll bale. After the roll bale has been wrapped, the plastic film is severed at a location between the roll bale and the feed rolls 130,132 as shown in FIG. 9d by operating the electric clutch 164 to stop the feed rolls 130,132 and simultaneously de-activating the solenoid 186 to permit the cutoff bar 168 to be moved to the severing position into contact with the plastic film while continuing to rotate the roll bale. The wrapped roll bale is then ready to be discharged from the baler, and the cutoff bar 168 is returned to the retracted position as shown in FIG. 9e with the leading end 128 of plastic film being held between the stationary feed rolls 130,132 so that the next roll bale may be wrapped in the same manner.

The following claims are intended to cover all modifications and variations of the preferred embodiments of the invention without departing from the spirit and scope of the invention.

Having thus described the invention, what is claimed is:

1. A method of wrapping a roll bale of crop material with plastic film comprising the steps of:
    (a) holding the end of a supply roll of plastic film between feed rolls during formation of a roll bale;
    (b) delivering the end of the supply roll of plastic film to the outer surface of a completed roll bale by operating a control means to energize an electric clutch in order to drive the feed rolls;
    (c) wrapping at least one full layer of the plastic film around the roll bale by driving the feed rolls while rotating the roll bale; and
    (d) severing the plastic film at a location between the roll bale and the feed rolls by operating the control means to deenergize the electric clutch in order to stop the feed rolls and to simultaneously deenergize a solenoid in order to permit a cutoff bar to be moved to a severing position into contact with the plastic film while continuing to rotate the roll bale.

* * * * *